(12) United States Patent
Holmbacka et al.

(10) Patent No.: US 12,374,885 B2
(45) Date of Patent: Jul. 29, 2025

(54) CONTROLLING USAGE OF ENERGY STORAGES

(71) Applicant: Elisa Oyj, Helsinki (FI)

(72) Inventors: Simon Holmbacka, Helsinki (FI); Jukka-Pekka Salmenkaita, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 18/715,135

(22) PCT Filed: Nov. 30, 2022

(86) PCT No.: PCT/FI2022/050798
§ 371 (c)(1),
(2) Date: May 31, 2024

(87) PCT Pub. No.: WO2023/111390
PCT Pub. Date: Jun. 22, 2023

(65) Prior Publication Data
US 2025/0141226 A1      May 1, 2025

(30) Foreign Application Priority Data
Dec. 14, 2021 (FI) ..................................... 20216272

(51) Int. Cl.
*H02J 3/00* (2006.01)
*H01M 10/42* (2006.01)
*H02J 9/04* (2006.01)

(52) U.S. Cl.
CPC .......... *H02J 3/001* (2020.01); *H01M 10/425* (2013.01); *H02J 9/04* (2013.01); *H01M 2010/4271* (2013.01); *H01M 2220/10* (2013.01)

(58) Field of Classification Search
CPC .......... H02J 3/001; H02J 9/04; H01M 10/425; H01M 2010/4271; H01M 2220/10
See application file for complete search history.

(56) References Cited

U.S. PATENT DOCUMENTS

| | | |
|---|---|---|
| 9,373,960 B2 | 6/2016 | Pande et al. |
| 9,722,443 B2 | 8/2017 | Ishida et al. |
| 9,960,637 B2 | 5/2018 | Sanders et al. |

(Continued)

FOREIGN PATENT DOCUMENTS

WO      20121 45563      10/2012

OTHER PUBLICATIONS

He, Guannan et al.: Optimal bidding strategy of battery storage in power markets considering performance based regulation and battery cycle life. Published in: IEEE Transactions on Smart Grid, 2016. Link to article, DOI: 10.1109/TSG.2015.2424314.

(Continued)

*Primary Examiner* — Ziaul Karim
(74) *Attorney, Agent, or Firm* — Espatent Oy

(57) ABSTRACT

A computer implemented method for controlling a pool of energy storages. The energy storages of the pool have capacity limits defining how the energy storages are intended to be used. The method is performed by detecting an exception event; selecting one or more energy storages associated with the detected exception event; and temporarily adjusting at least one capacity limit of the selected energy storages in accordance with the detected exception event.

19 Claims, 3 Drawing Sheets

(56) References Cited

U.S. PATENT DOCUMENTS

| | | |
|---|---|---|
| 11,014,466 B2 | 5/2021 | Sinha et al. |
| 11,387,654 B2* | 7/2022 | Gadh .................. H02J 7/00304 |
| 2009/0139781 A1* | 6/2009 | Straubel .................. B60L 53/14 |
| | | 701/22 |
| 2012/0249048 A1 | 10/2012 | Nishibayashi et al. |
| 2013/0249289 A1 | 9/2013 | Patel et al. |
| 2013/0345884 A1* | 12/2013 | Forbes, Jr. ........ H02J 13/00028 |
| | | 700/286 |
| 2014/0042978 A1 | 2/2014 | Nishibayashi et al. |
| 2016/0006081 A1* | 1/2016 | Eaglesham ........... H01M 10/48 |
| | | 429/61 |
| 2016/0211668 A1 | 7/2016 | Becker et al. |
| 2016/0218511 A1 | 7/2016 | Li et al. |
| 2016/0322835 A1* | 11/2016 | Carlson .................... H02J 7/35 |
| 2019/0020196 A1 | 1/2019 | Poon |
| 2019/0041886 A1 | 2/2019 | Hakim et al. |
| 2019/0056451 A1 | 2/2019 | Asghari et al. |
| 2019/0135578 A1 | 5/2019 | Perunka et al. |
| 2019/0206000 A1 | 7/2019 | Elbsat et al. |
| 2019/0219293 A1* | 7/2019 | Wenzel .................. G06Q 50/06 |
| 2019/0273382 A1* | 9/2019 | Zhang ..................... H02J 3/381 |
| 2019/0359065 A1 | 11/2019 | Al-Awami et al. |
| 2019/0379234 A1* | 12/2019 | Li ........................ H02J 7/0071 |
| 2020/0231056 A1 | 7/2020 | Sadano et al. |
| 2020/0313439 A1 | 10/2020 | Kakuda |
| 2021/0221247 A1 | 7/2021 | Daniel et al. |
| 2021/0328432 A1* | 10/2021 | Boulineau ............. H02J 7/0048 |
| 2022/0379752 A1* | 12/2022 | Zenner ..................... B60L 53/18 |
| 2023/0256848 A1* | 8/2023 | Jorgenson ................ C25B 1/04 |
| | | 320/101 |

OTHER PUBLICATIONS

He, Guannan et al.: Power System Dispatch with Marginal Degradation Cost of Battery Storage. Jun. 9, 2020. http://arxiv.org/abs/1904.07771v3.

Preger, Yuliya et al.: Degradation of Commercial Lithium-Ion Cells as a Function of Chemistry and Cycling Conditions. 2020 Journal of The Electrochemical Society 167 120532.

Xu, Bolun et al.: Factoring the Cycle Aging Cost of Batteries Participating in Electricity Markets. Jul. 26, 2017. http://arxiv.org/abs/1707.04567v2.

Xu, Bolun et al.: Modeling of Lithium-Ion Battery Degradation for Cell Life Assessment. Article in: IEEE Transactions on Smart Grid • Jun. 2016. DOI: 10.1109/TSG.2016.2578950.

Parhizi, S. et al.: State of the art in research on microgrids: a review. IEEE Access. vol. 3, 2015 pp. 890-925. Digital Object Identifier 10.1109/ACCESS.2015.2443119.

* cited by examiner

501. Assign energy storages to a normal operations group or to a special operations group, SOG 502. Use a first energy storage of the SOG for an exception event 503. Reassign the first energy storage to the normal operations group 504. Dynamically queue new energy storages to the SOG

Fig. 5

CONTROLLING USAGE OF ENERGY STORAGES

TECHNICAL FIELD

The present disclosure generally relates to controlling usage of energy storages. As an example, the controlled energy storages may provide backup energy source for devices of a telecommunications network.

BACKGROUND

This section illustrates useful background information without admission of any technique described herein representative of the state of the art.

In normal operation, electric grid is used as a power supply for various network devices of telecommunications networks. In order to ensure operation of the telecommunications network during possible outages of the electric network, at least some network devices are equipped with energy storages that operate as backup batteries. The backup batteries are used for power supply, if the electric grid is not available.

In addition to providing backup energy source, the energy storages may be used for further optimization purposes, such as balancing electric grid.

Now, there are provided some new considerations concerning controlling usage of energy storages. The controlled energy storages may be backup energy storages of telecommunications networks or equally energy storages of some other context.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for controlling a pool of energy storages. The energy storages of the pool have capacity limits defining how the energy storages are intended to be used. In an example case, the method is performed by detecting an exception event;
  selecting one or more energy storages associated with the detected exception event; and
  temporarily adjusting at least one capacity limit of the selected energy storages in accordance with the detected exception event.

In some embodiments, the capacity limits of the energy storages of the pool comprise a first capacity limit and a second capacity limit, wherein the first capacity limit defines minimum charge that is to be maintained in the energy storage and the second capacity limit defines maximum charge; wherein energy storage capacity falling between the first capacity limit and the second capacity limit is usable for energy optimization purposes, and the temporary adjustment of the at least one capacity limit comprises temporarily adjusting at least one of the first capacity limit and the second capacity limit of the selected energy storages.

In some embodiments, the exception event defines at least type and time of the exception event.

In some embodiments, the exception event is related to dynamically changing pricing of electric grid, load of electric grid and/or frequency balancing of electric grid.

In some embodiments, the exception event is related to weather conditions.

In some embodiments, the exception event is related to special operations to be performed in energy storages.

In some embodiments, the method further comprises
  collecting exception situation data from one or more information sources; and
  generating and scheduling exception events based on the collected exception situation data.

In some embodiments, the one or more information sources provide information about at least one of: pricing of electric grid, load of electric grid, weather conditions, and special operations to be performed in energy storages.

In some embodiments, the method further comprises assigning energy storages of the pool to a normal operations group or to a special operations group, wherein only energy storages of the special operations group are usable for exception events related to special operations to be performed in energy storages.

In some embodiments, a certain energy storage assigned to the special operations group is reassigned to the normal operations group after using said certain energy storage for an exception event related to special operations to be performed in energy storages.

In some embodiments, at maximum a predefined percentage of total capacity of the pool of energy storages is assigned to the special operations group.

In some embodiments, energy storages are dynamically queued to the special operations group.

In some embodiments, geographic locations of the energy storages are taken into account in assigning the energy storages to the special operations group.

In some embodiments, the pool of energy storages provides backup energy source for base station sites of a telecommunications network.

In some embodiments, at least two energy storages are configured to provide backup energy source for a certain base station site, wherein at least one of the at least two energy storages of said certain base station site is assigned to the normal operations group.

According to a second example aspect of the present invention, there is provided an apparatus comprising a processor and a memory including computer program code; the memory and the computer program code configured to, with the processor, cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIGS. 4-5 show flow charts according to example embodiments.

DETAILED DESCRIPTION

Figure 1:
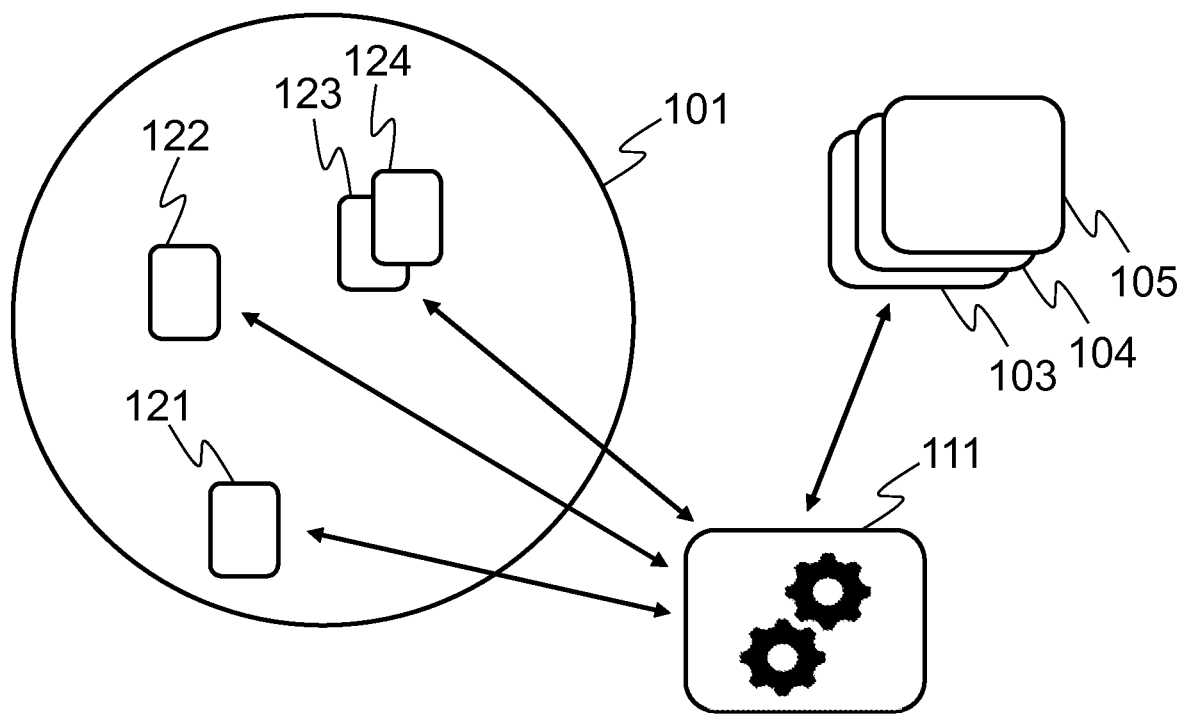
FIG. 1 schematically shows a system according to an example embodiment.

In the following description, like reference signs denote like elements or steps.

Various embodiments of present disclosure provide mechanisms to control usage of energy storages. The controlled energy storages may be backup energy storages of a telecommunications networks or backup energy storages of an industrial site or energy storages owned by a household or equally energy storages in some other context. In an embodiment, the controlled energy storages are managed by the same entity, such as operator of a telecommunications network.

In general, the energy storages in this disclosure refer to battery energy storages that are able to handle regular charge and discharge cycles. For example, lithium-ion batteries are such energy storages. In more detail, one or more of the following battery technologies may be represented in the pool of battery assets: lithium-nickel-cobalt, NCA, lithium-iron-phosphate, LFP, lithium-nickel-manganese-cobalt, NMC, and solid-state batteries. However, lithium-ion batteries should not regularly exceed extreme low or high charge values. For example, state of charge below 5% or above 95% should be avoided. Such limitations should be taken into account in usage of the lithium-ion batteries to avoid increased wear of the batteries.

In general, various embodiments suit for arrangement where energy storages are normally used according to certain predefined rules. Such rules aim at optimal usage of the energy storages with minimal wear. There are, however, exceptional situations when such predefined rules may not be optimal or when such predefined rules need to be violated on purpose for example to enable full re-calibration cycling. Various embodiments of present disclosure aim at handling such exceptional situations so that usage of the energy storages may be automatically adjusted to ensure suitable operation. The exceptional situations may be related to pricing of electric grid, load of electric grid, frequency balancing of electric grid, weather conditions and/or special operations to be performed in certain energy storage such as running full charge and discharge cycle in the energy storage. Full charge and discharge cycle may be needed for example for purposes of determining the state of health of specific energy storage, or in order to increase the longevity of specific energy storage, or to allow a Battery Management System do some other maintenance/longevity action.

Pricing of electric grid may refer to primary energy market pricing, but additionally or alternatively also to pricing of reserve markets or ancillary energy market services.

Spot pricing is one tool for assessing load of the electric grid. In spot pricing of electricity, the supply and demand in the market influence the electricity price. During high demand periods the prices are higher and during lower demand periods the prices are lower. For example, in Nordic countries, Nord Pool provides spot pricing of electricity. The pricing may change on hourly basis or even every 15 minutes or every 30 minutes. The pricing may be set for example for 24-hour periods, i.e. the prices are available one day ahead. For example, sudden unexpected changes in spot pricing can be considered an exceptional situation discussed above. Additionally or alternatively, intraday price fluctuation (e.g. sudden changes thereof) may be used for identifying exceptional situations.

Frequency balancing of electric grid may be arranged for example using automatic Frequency Restoration Reserve, aFRR, capacity market.

Frequency balancing of electric grid may also be arranged for example using Frequency Containment Reserve for Normal Operation (FCR-N) or Frequency Containment Reserve for Disturbances (FCR-D) that are active power reserves that are automatically controlled based on the frequency deviation. Their purpose is to contain the frequency during normal operation and disturbances.

Another example of exceptional situations are extreme weather conditions, such as storms or extreme temperatures.

FIG. 1 schematically shows an example scenario according to an embodiment. The scenario shows a pool 101 of energy storages 121-124. The energy storages 121-124 may be located at different geographical locations, but equally there may be plurality of energy storages at the same location. FIG. 1 shows energy storages 123 and 124 at the same location and energy storages 121 and 122 individually at different locations. It is to be noted that FIG. 1 shows four energy storages by way of example and in practical implementations there may be significantly more energy storages.

Further, the scenario shows an automation system 111. Still further, there are services 103-105 that operate as information sources for the automation system 111. By way of example the service 103 may provide information on pricing/load/frequency balancing of electric grid, the service 104 may provide information on weather conditions e.g. in the form of weather forecasts, and service 105 may provide information on special operations to be performed in energy storages.

The automation system 111 is configured to implement at least some example embodiments of present disclosure to control usage of the energy storages 121-124. For this purpose, the automation system 111 is operable to interact with the energy storages 121-124 or equipment associated thereto. The automation system 111 is operable to receive information from one or more of the services 103-105. Additionally, the automation system 111 may be operable to interact with maintenance personnel and for example receive some predefined settings or other user input.

Further, the automation system 111 may be operable to obtain data from other sources, such as databases or other storage devices.

Figure 2:
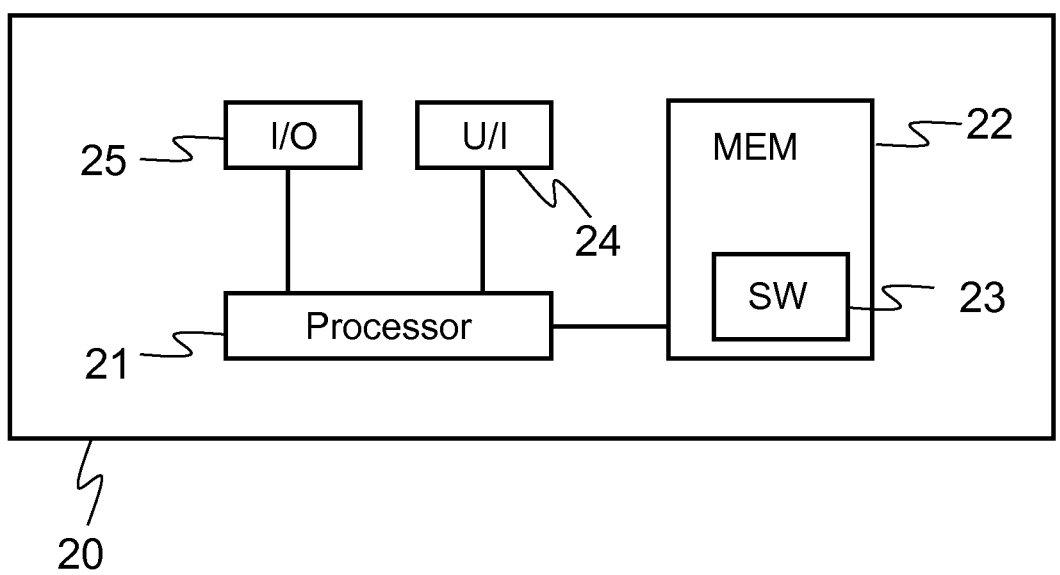
FIG. 2 shows a block diagram of an apparatus according to an example embodiment.

FIG. 2 shows a block diagram of an apparatus 20 according to an embodiment. The apparatus 20 is for example a general-purpose computer, a server, cloud computing environment or some other electronic data processing apparatus. The apparatus 20 can be used for implementing at least some embodiments of the invention. That is, with suitable configuration the apparatus 20 is suited for operating for example as the automation system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

Figure 3:
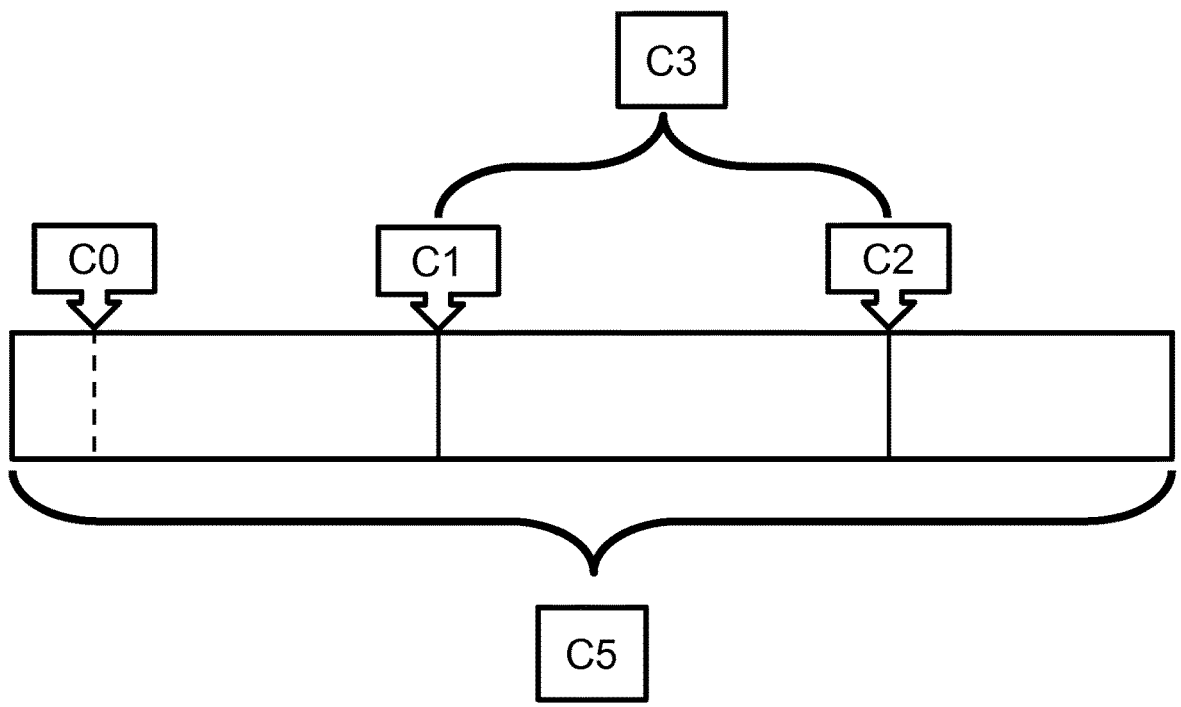
FIG. 3 illustrates an example of capacity limits of an energy storage.

In an embodiment, energy storages have capacity limits defining how the energy storages are intended to be used. FIG. 3 illustrates an example of capacity limits of an energy storage.

Full length of a bar shown in FIG. 3 illustrates full capacity C5 of the energy storage. Further, FIG. 3 shows a first capacity limit C1, a second capacity limit C2, optimization capacity C3 defined by the difference between C1 and C2, and a third capacity limit C0.

The first capacity limit C1 defines a minimum charge that is to be maintained in the energy storage e.g. for emergency energy backup purposes. For example, in telecommunications networks, there may be legal or regulatory requirement to maintain such minimum charge that needs to be available in case of power failure.

The second capacity limit C2 defines maximum charge that should not be exceeded. This is the limit at which the battery is maximally charged and which should not be regularly exceeded to not increase wear of the energy storage.

The optimization capacity C3 falling between the first capacity limit C1 and the second capacity limit C2 is usable e.g. for energy optimization purposes such as electric grid load balancing and/or charging cost optimization by discharging the C3 capacity during expensive or high load hours and charging during cheap or low load hours.

The third capacity limit C0 indicates minimum charge level below which the energy storage is not recommended to go due to avoid increased wear. In a typical case, the first capacity limit C1 is higher than the third capacity limit C0, but this is not mandatory. Further, it is not mandatory to have the third capacity limit C0 or the third capacity limit C0 may be set to 0 to allow full discharge of the energy storage for example in emergency situation where the backup reserve defined by the first capacity limit C1 is taken into use.

Figure 4:
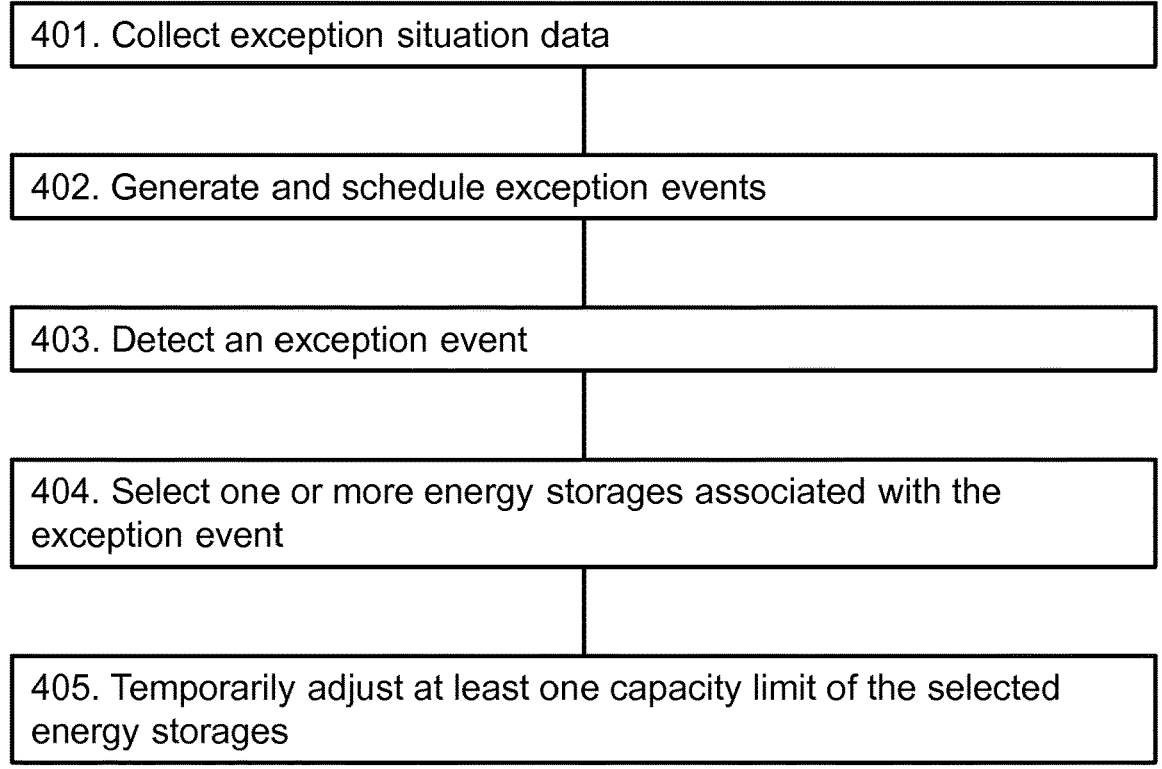

FIGS. 4-5 show flow charts according to example embodiments. FIGS. 4-5 illustrate processes comprising various possible steps including some optional steps while also further steps can be included and/or some of the steps can be performed more than once. The processes may be implemented in the automation system 111 of FIG. 1 and/or in the apparatus 20 of FIG. 2. The processes are implemented in a computer program code and does not require human interaction unless otherwise expressly stated. It is to be noted that the processes may however provide output that may be further processed by humans and/or the processes may require user input to start.

FIG. 4 concerns controlling a pool of energy storages, where the energy storages have one or more capacity limits defining how the energy storages are intended to be used. The capacity limits may comprise for example one or more of the capacity limits discussed in connection with FIG. 3. The process of FIG. 4 comprises the following steps:

401: Exception situation data is collected from one or more information sources.

The one or more information sources may comprise one or more of information sources 103-105 of FIG. 1. The information source(s) provide information about at least one of: (dynamically changing) pricing of electric grid, load of electric grid, weather conditions, and special operations to be performed in energy storages. In general, the exception situation data refers to data indicating exceptional conditions, such as peak in load of electric grid, peak in electricity pricing, frequency balancing request, extreme weather conditions, that would likely require deviation from normal usage of the energy storages.

402: Exception events are generated and scheduled based on the collected exception situation data.

In many cases exception situation data relates to predicted or known exceptional conditions in future. Based on timing of the exceptional conditions, a corresponding exception event is scheduled and stored for later use. In an embodiment, an exception event defines at least type and time of the exception event.

403: An exception event is detected. The exception event is for example an exception event previously scheduled in step 402. Additionally or alternatively exception events may be handled on regular time intervals. An exception event may be detected by expiry of a timeout.

In some embodiments, the exception event relates to dynamically changing pricing of electric grid, load of electric grid, frequency balancing of electric grid, weather conditions, or special operations to be performed in energy storages. The pricing may be intra-day pricing or spot pricing or the like. The weather conditions may refer to forecasted weather conditions or to detected weather conditions.

404: One or more energy storages associated with the detected exception event are selected.

405: At least one capacity limit of the selected energy storages is temporarily adjusted in accordance with the detected exception event. The adjustments that are made depend for example on the type and time or duration of the exception event. E.g. one or more of the capacity limits discussed in connection with FIG. 3 are adjusted.

After expiration of the exception event, the adjusted capacity limits are returned to their normal state.

In the following some practical capacity adjustment examples are discussed.

Example 1: Based on storm warnings or other extreme weather forecast for certain geographical area, an exception event related to weather conditions is generated and scheduled for the forecasted time period. Based on the exception event, the first capacity limit C1 is temporarily increased prior to the forecasted timing of the extreme weather to provide additional backup energy. After the event the first capacity limit C1 is returned to the normal value. The capacity adjustment may be performed on each energy storage on the geographical area where the extreme weather takes place. Additionally, also the second capacity limit C2 may be temporarily increased, but this is not mandatory.

In more detail, the process may be the following:
In normal settings, the first capacity limit C1 is 40% of the maximum capacity.
Storm weather is detected, and corresponding exception event is generated. It is detected that the storm weather may affect 100 energy storage sites. It is defined that the exception event concerns these 100 energy storages and that the first capacity limit C1 is to be increased to 70% of the maximum capacity prior to the storm and decreased back to 40% the maximum capacity after the storm.
There may be a centralized controller that interacts with the energy storage sites and requests the 100 energy storages to increase the first capacity limit C1 to 70% of the maximum capacity. Based on the requests, Battery Management System, BMS, (or other similar control element) of each site adjusts the first capacity limit C1 of the respective energy storage. The centralized controller may be a process running in the automation system 111 of FIG. 1.
After the storm, the centralized controller requests the 100 energy storages to decrease the first capacity limit C1 back to 40% of the maximum capacity. Based on the requests BMS of each site adjusts the first capacity limit C1 of the respective energy storage.

Example 2: Based on detecting exceptional increase in electricity pricing, an exception event related to the pricing is generated and scheduled for the forecasted time period. Based on the exception event, the second capacity limit C2 is temporarily increased to allow larger optimization capacity C3. Larger optimization capacity C3 may provide possibility to achieve cost saving at the price of slightly increased storage capacity wear. After the event the second capacity limit C2 is returned to the normal value to avoid continued degradation of storage capacity wear. The capacity adjustment may be performed on all controlled energy storages.

In more detail, the process may be the following:
In normal settings, the second capacity limit is 80% of the maximum capacity.
An extreme spike in the next day spot price is detected due to a nuclear plant outage, and corresponding exception event is generated. Due to nature of the exception event, it is defined that the exception event concerns all energy storages and that the second capacity C2 limit is to be increased to 95% of the maximum capacity on current day and decreased back to 80% the maximum capacity on the next day evening.
There may be a centralized controller that interacts with the energy storage sites and requests the energy storages to increase the second capacity limit C2 to 95% of the maximum capacity. Based on the requests BMS (or other similar control element) of each site adjusts the second capacity limit C2 of the respective energy storage. The centralized controller may be a process running in the automation system 111 of FIG. 1.
On the next day evening, the centralized controller requests the energy storages to decrease the second capacity limit C2 back to 80% of the maximum capacity. Based on the requests BMS of each site adjusts the second capacity limit C2 of the respective energy storage.

Example 3: A special operations event related to periodic re-calibration of Battery Management System, BMS, is detected. BMS re-calibration is a process that is needed for calibrating the charge levels on the energy storages in order for the BMS to accurately estimate the correct State of Charge, SoC and/or State of Health, SoH, of the energy storages, of the energy storage at a given time. Based on the exception event, the second capacity limit C2 is temporarily increased and the first and third capacity limits C1 and C0 are temporarily decreased to allow full discharge and charge cycle. After completing the re-calibration process the capacity limits C0, C1 and C2 are returned to the normal values to return to normal operation. The capacity adjustment may be performed on certain selected energy storages. In general, it is not desirable to perform this kind of capacity adjustment concurrently in many energy storages in order to ensure normal operation of the energy storages at all times.

In more detail, the process may be the following:
In normal settings, the third capacity limit C0 is 5% of the maximum capacity, the first capacity limit C1 is 40% of the maximum capacity and the second capacity limit C2 is 80% of the maximum capacity.
A BMS re-calibration need is detected based on periodic time interval and energy storage to re-calibrate are picked from a special operations group, SOG, queue, and corresponding exception event is generated. The special operations group is discussed in more detail in connection with FIG. 5. It is defined that the exception event concerns one energy storage. Alternatively, this kind of exception event could concern a couple of energy storages, but not all energy storages at the same time. Further it is defined in the event that the second capacity limit C2 is to be increased to 100% of the maximum capacity, and the third capacity limit C0 and the first capacity limit C1 are to be decreased to 0% of the maximum capacity, and the capacity limits are to be returned to their normal values after completing the re-calibration process.

There may be a centralized controller that interacts with the energy storage sites and requests the selected energy storage to increase the second capacity limit C2 to 100% of the maximum capacity and to decrease the third capacity limit C0 and the first capacity limit C1 to 0% of the maximum capacity. Based on the request BMS of the energy storage site adjusts the respective capacity limits of the energy storage and performs the re-calibration process. The centralized controller may be a process running in the automation system 111 of FIG. 1.

After completion of the re-calibration process, the centralized controller requests the energy storage to decrease the second capacity limit C2 back to 80% of the maximum capacity, to increase the third capacity limit C0 back to 5% of the maximum capacity, and to increase the first capacity limit C1 back to 40% of the maximum capacity. Based on the request BMS of the energy storage site adjusts the respective capacity limits of the energy storage and performs the re-calibration process.

FIG. 5 concerns further details of controlling the pool of energy storages particularly in relation to special operations to be performed in the energy storages. The process of FIG. 5 comprises the following steps:

501: Energy storages of the pool are assigned to a normal operations group or to a special operations group, SOG. In this embodiment, only energy storages of the special operations group are usable for exception events related to special operations to be performed in energy storages. E.g. energy storages requiring maintenance operations are queued to SOG. For example, the BMS re-calibration example above may be applied only to energy storages assigned to the special operations group. In this way it is ensured that all energy storages cannot be selected for special operations at the same time.

The energy storages in the normal operations group are usable for normal energy optimization processes and may be selected for example for exception events related to pricing of electric grid, load of electric grid, frequency balancing of electric grid, and weather conditions.

In practice, it may be that there is no need to concretely assign any energy storages in the normal operations group. Instead, all energy storages that are not in the SOG can be assumed to be in normal operations group.

In an example embodiment, there is a maximum limit for the amount of energy storages that can be in the SOG at the same time. The limit may be for example a predefined percentage of total capacity of the pool of energy storages or a predefined percentage of all energy storages. The limit may be for example 2%, or the limit may be 1-10%.

In an example embodiment, the energy storages in the SOG may be arranged in a queue that can be re-ordered or prioritized either automatically or manually for example for scheduling (physical) maintenance operations. In this way, it may be easier to meet maintenance schedules or at least control the maintenance schedules.

In an embodiment, geographic locations of the energy storages are taken into account in assigning the energy storages to the special operations group. In this way it can be selected for example that co-located energy storages or energy storages that are in close proximity with each other are not concurrently assigned to the SOG. As a practical example, it can be ensured that energy storages of adjacent base station sites are not concurrently assigned to the SOG. There may be for example minimum distance that is required in relation to the energy storages already in the SOG. Numerical value of such minimum distance clearly depends on the context and the density of the energy storages.

502: A first energy storage of the SOG is used for an exception event that is related to special operations.

503: The first energy storage is reassigned to the normal operations group after the exception event. In practice, it may suffice to return the capacity limits of the first energy storage back to the normal values to reassign the first energy storage to the normal operations group. I.e. any additional concrete steps are not necessarily needed.

504: Energy storages (of the normal operations group) are dynamically queued to the special operations group.

In an embodiment, there is a process that monitors and collects data on exception events related to the SOG and the SOG queue. If the SOG queue is constantly growing over a longer time (e.g. week), the size of the SOG may be increased (e.g. from 2% to 3%). Additionally or alternatively, the size of the SOG may vary on daily or weekly basis. Larger size may be applied during quiet night hours and weekends, for example. This may be suitable for example if some optimization actions (e.g. automatic Frequency Restoration Reserve, aFRR, or Frequency Containment Reserve, FCR, capacity market) are not applicable at those times.

In an embodiment, the pool of energy storages that is being controlled provides backup energy source for base station sites of a telecommunications network. In such case, there may be an arrangement where at least two energy storages are co-located at one base station site and are configured to provide backup energy source for that base station site. In an embodiment, at least one of the at least two energy storages of such base station site is assigned to the normal operations group. That is, both or all energy storages of the site cannot be concurrently assigned to the SOG. In this way there is at all times at least one energy storage to provide backup energy.

Without in any way limiting the scope, interpretation, or application of the appended claims, a technical effect of one or more of the example embodiments disclosed herein is a flexible and advantageous control of energy storages. A further technical advantage is ability to automatically adjust usage of energy storages in exceptional situations.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for controlling a pool of energy storages,
wherein the energy storages of the pool have capacity limits defining how the energy storages are intended to be used; wherein the method comprises:
detecting an exception event;
selecting one or more energy storages associated with the detected exception event;
adjusting at least one capacity limit of the selected energy storages in accordance with the detected exception event until expiration of the exception event; and
assigning energy storages of the pool to:
a normal operations group wherein energy storages of the normal operations group are usable for exception events related to pricing of electric grid, load of electric grid, frequency balancing of electric grid, and weather conditions, or to:
a special operations group, wherein only energy storages of the special operations group are usable for exception events related to maintenance special operations to be performed in energy storages, wherein
the capacity limits of the energy storages of the pool comprise a first capacity limit, C1, and a second capacity limit, C2, wherein the first capacity limit, C1, defines minimum charge that is to be maintained in the energy storage and the second capacity limit, C2, defines maximum charge; wherein energy storage capacity, C3, falling between the first capacity limit, C1, and the second capacity limit, C2, is usable for energy optimization purposes, and wherein
the adjustment of the at least one capacity limit comprises adjusting at least one of the first capacity limit, C1, and the second capacity limit, C2, of the selected energy storages.

2. The method of claim 1, wherein the exception event defines at least type and time of the exception event.

3. The method of claim 1, wherein the exception event is related to dynamically changing pricing of electric grid, load of electric grid and/or frequency balancing of electric grid.

4. The method of claim 1, wherein the exception event is related to weather conditions.

5. The method of claim 1, further comprising
collecting exception situation data from one or more information sources; and
generating and scheduling exception events based on the collected exception situation data.

6. The method of claim 1, wherein the one or more information sources provide information about at least one of: pricing of electric grid, load of electric grid, weather conditions, and special operations to be performed in energy storages.

7. The method of claim 1, wherein a certain energy storage assigned to the special operations group is reassigned to the normal operations group after using said certain energy storage for an exception event related to special operations to be performed in energy storages.

8. The method of claim 1, wherein at maximum a predefined percentage of total capacity of the pool of energy storages is assigned to the special operations group.

9. The method of claim 1, wherein energy storages are dynamically queued to the special operations group.

10. The method of claim 1, wherein geographic locations of the energy storages are taken into account in assigning the energy storages to the special operations group.

11. The method of claim 1, wherein the pool of energy storages provides backup energy source for base station sites of a telecommunications network.

12. The method of claim 11, wherein at least two energy storages are configured to provide backup energy source for a certain base station site, wherein at least one of the at least two energy storages of said certain base station site is assigned to the normal operations group.

13. The method of claim 1, wherein the capacity limits define charge levels of the energy storages.

14. An apparatus comprising
a memory section comprising computer executable program code; and
a processing section configured to cause the apparatus to perform, when executing the program code, at least: the method of claim 1.

15. A non-transitory computer readable medium having stored there on computer executable program code which when executed in an apparatus causes the apparatus to perform the method of claim 1.

16. The method of claim 1, wherein the special operations to be performed in energy storages comprise a maintenance action in the energy storage.

17. The method of claim 1, wherein the special operations to be performed in energy storages comprise running a full charge and discharge cycle in the energy storage.

18. The method of claim 1, wherein energy storages requiring maintenance operations are assigned to the special operations group.

19. The method of claim 16, wherein at maximum a predefined percentage of total capacity of the pool of energy storages is assigned to the special operations group.

* * * * *